United States Patent
Watanabe

(10) Patent No.: US 9,891,391 B2
(45) Date of Patent: Feb. 13, 2018

(54) BOOT FOR OPTICAL CONNECTOR FERRULE

(71) Applicant: SANWA DENKI KOGYO CO., LTD., Tokyo (JP)

(72) Inventor: Yasuhiro Watanabe, Tokyo (JP)

(73) Assignee: SANWA DENKI KOGYO CO. LTD., Tokyo (JP)

( * ) Notice: Subject to any disclaimer, the term of this patent is extended or adjusted under 35 U.S.C. 154(b) by 0 days.

(21) Appl. No.: 15/361,689

(22) Filed: Nov. 28, 2016

(65) Prior Publication Data
US 2017/0160494 A1 Jun. 8, 2017

(30) Foreign Application Priority Data
Dec. 4, 2015 (JP) ................................. 2015-237590

(51) Int. Cl.
*G02B 6/36* (2006.01)
*G02B 6/38* (2006.01)

(52) U.S. Cl.
CPC ......... *G02B 6/3874* (2013.01); *G02B 6/3821* (2013.01); *G02B 6/3885* (2013.01); *G02B 6/3887* (2013.01); *G02B 6/3893* (2013.01); *G02B 6/3839* (2013.01); *G02B 6/3851* (2013.01); *G02B 6/3861* (2013.01)

(58) Field of Classification Search
CPC .. G02B 6/3885; G02B 6/3821; G02B 6/3861; G02B 6/3851; G02B 6/3874; G02B 6/3893
USPC ........................................ 385/60, 72, 78, 80
See application file for complete search history.

(56) References Cited

U.S. PATENT DOCUMENTS

| 4,952,263 A * | 8/1990 | Kakii ................... | G02B 6/3839 |
| | | | 156/153 |
| 5,802,230 A | 9/1998 | Kuribayashi et al. | |
| 5,815,621 A * | 9/1998 | Sakai ................... | B24B 19/226 |
| | | | 264/1.1 |

(Continued)

FOREIGN PATENT DOCUMENTS

| JP | S63296008 A | 12/1988 |
| JP | 2001074973 A | 3/2001 |

(Continued)

OTHER PUBLICATIONS

European Search Report dated Mar. 27, 2017, for EP 16201453.4.

*Primary Examiner* — Kaveh C Kianni
*Assistant Examiner* — Hung Lam
(74) *Attorney, Agent, or Firm* — Bacon & Thomas, PLLC

(57) ABSTRACT

A boot for an optical connector ferrule is provided with a ribbon fiber insertion portion internally provided with vertical partition portions so as to section ribbon fibers into upper and lower stages and enable to insert the ribbon fibers, and a front opening portion exposing the optical fiber core wires in the respective leading ends of the inserted ribbon fiber groups to a forward outer side, and the boot for the optical connector ferrule is inserted to a boot insertion opening portion formed in a rear end side of the optical connector ferrule. An exposure notch portion is provided in a rear end portion of each of both upper and lower wall surfaces of the ribbon fiber insertion portion for forming a fiber guide of each of the ribbon fibers by making the rear end portion side of the vertical partition portions protrude outward from the ribbon fiber insertion portion.

4 Claims, 13 Drawing Sheets

(56) References Cited

U.S. PATENT DOCUMENTS

| | | | |
|---|---|---|---|
| 6,913,394 | B2 | 7/2005 | Iwano et al. |
| 7,534,050 | B2 | 5/2009 | Kachmar |
| 2002/0004336 | A1 | 1/2002 | Yamaguchi |
| 2002/0122634 | A1 | 9/2002 | Miyake et al. |
| 2002/0154867 | A1 | 10/2002 | Ohtsuka et al. |
| 2002/0159717 | A1 | 10/2002 | Miyake et al. |
| 2006/0115218 | A1 | 6/2006 | Howard et al. |
| 2013/0028560 | A1 | 1/2013 | Arnold et al. |
| 2016/0324402 | A1 | 11/2016 | Yajima |

FOREIGN PATENT DOCUMENTS

| | | | |
|---|---|---|---|
| JP | 2001083367 | A | 3/2001 |
| JP | 2002182067 | A | 6/2002 |
| JP | 2004061883 | A | 2/2004 |
| JP | 2005234498 | A | 9/2005 |

\* cited by examiner

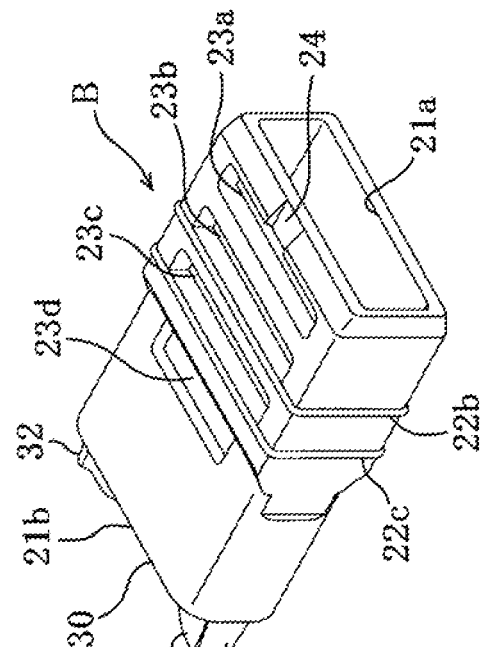
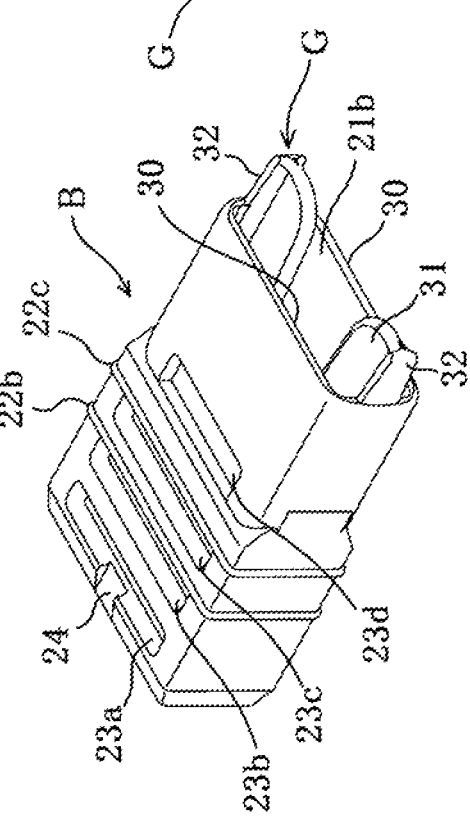
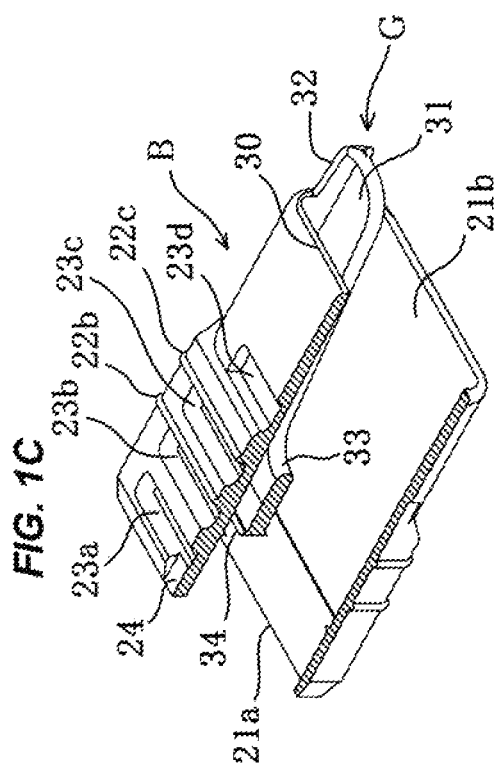

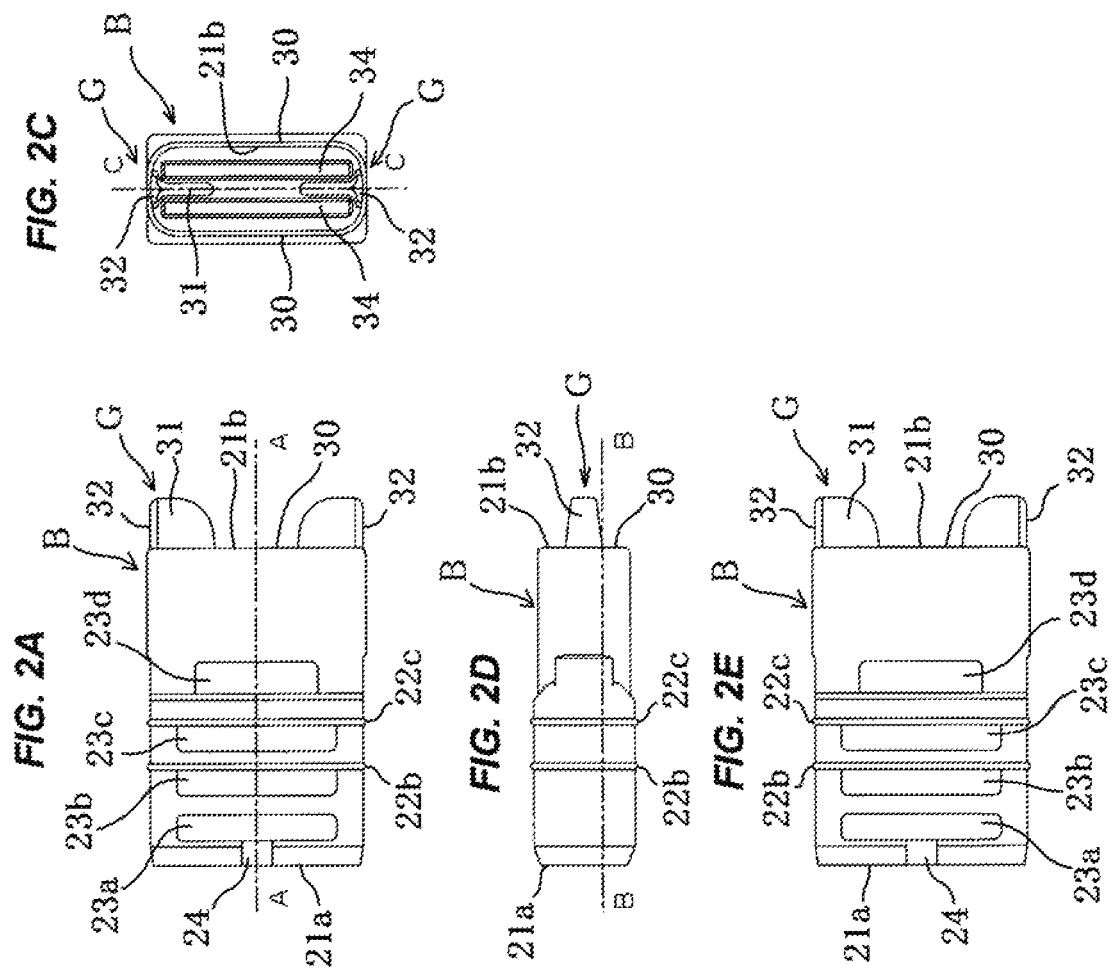

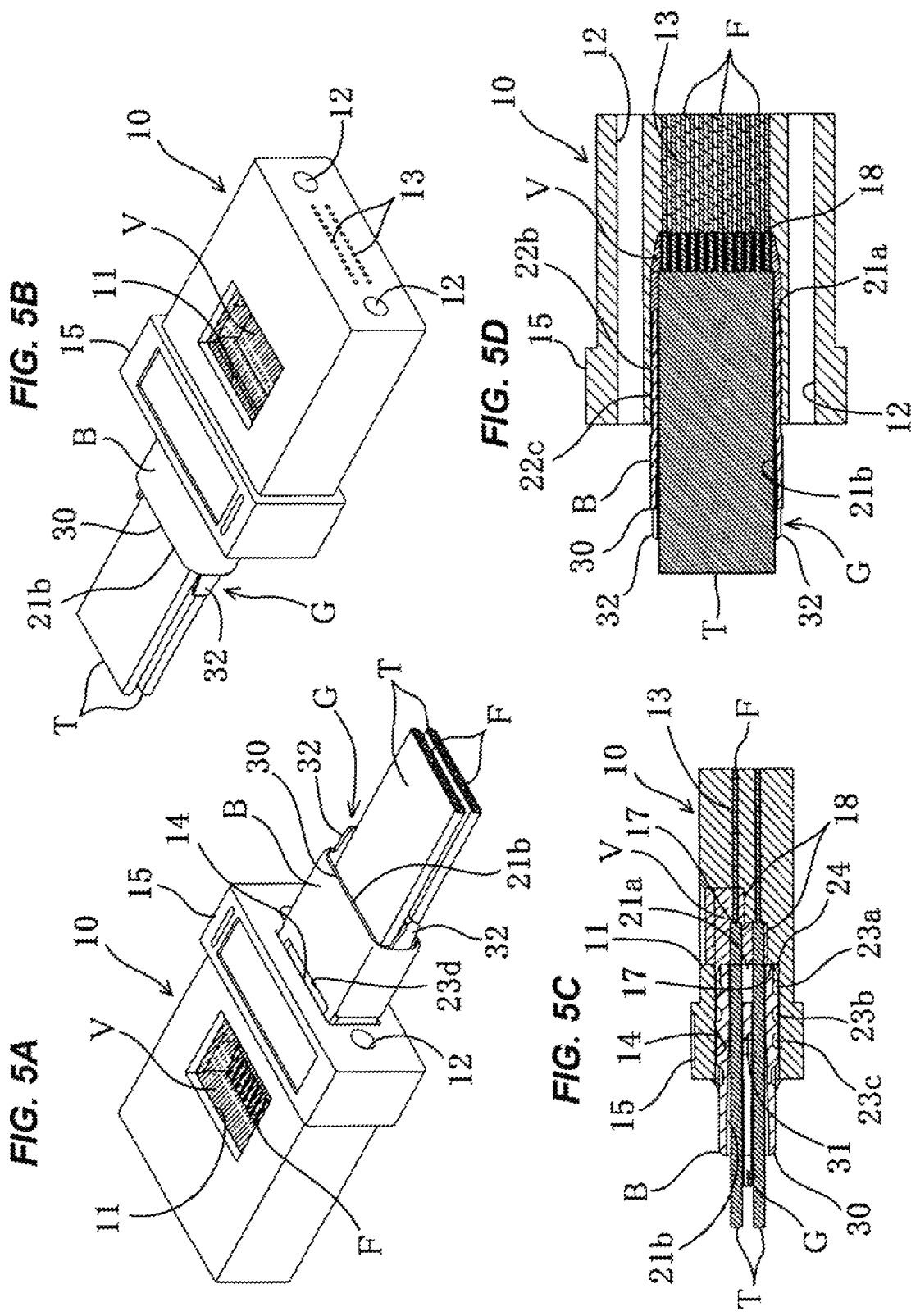

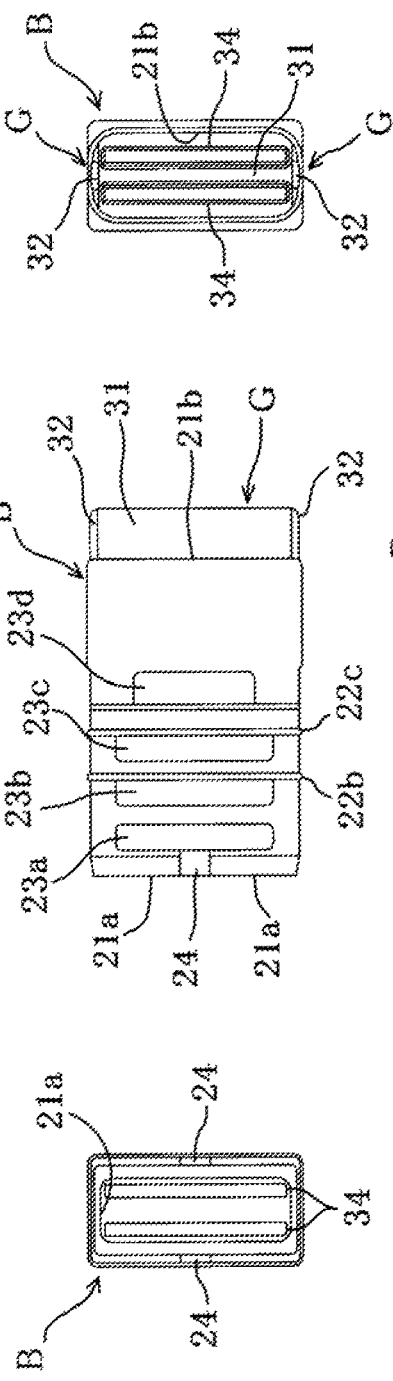

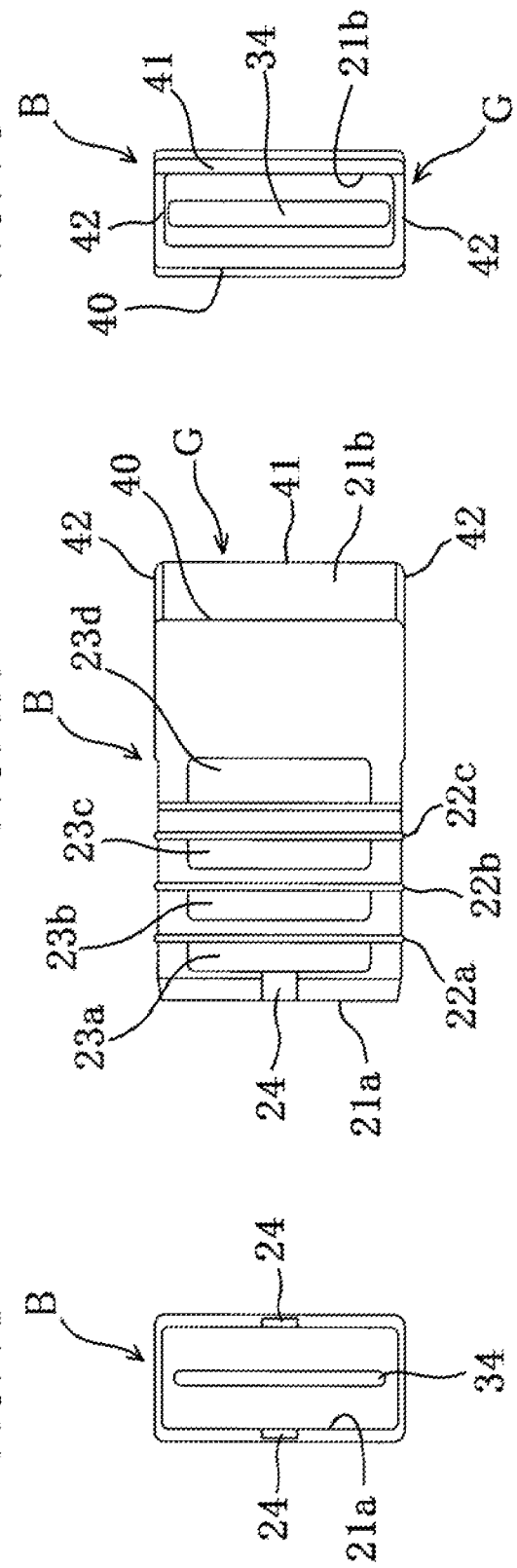

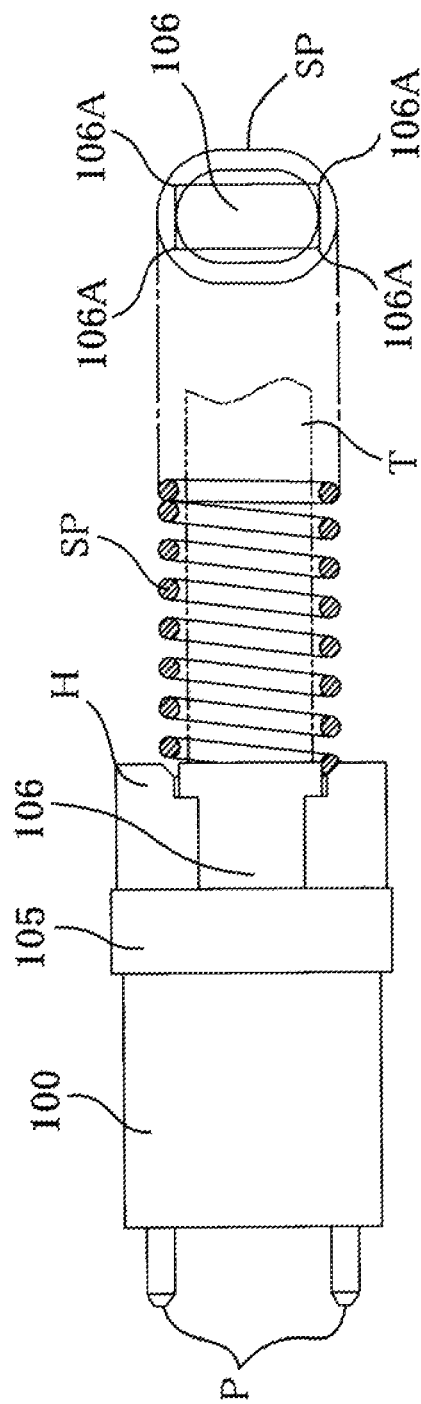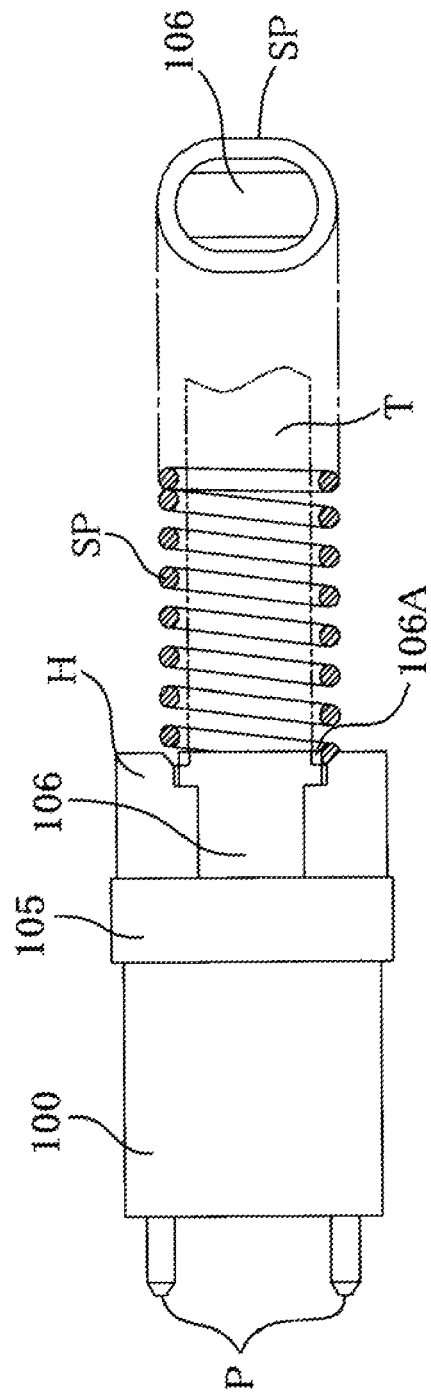

BOOT FOR OPTICAL CONNECTOR FERRULE

BACKGROUND OF THE INVENTION

Field of the Invention

The present invention relates to a boot used in an optical connector ferrule for forming a muticore collective connector, for example, Mechanically-Transferable-splicing-Connector (hereinafter, refer to as MT connector), Multifiber-Push-on-Connector (hereinafter, refer to as MT connector), and Multifiber-Push-on-Connector (hereinafter, refer to as MPO connector), which is used for connecting optical fiber core wires and optical fiber tape (ribbon fiber) core wires.

Description of the Conventional Art

As a collector for collectively connecting with low loss SM type optical fiber single core wires and tape core wires, there has been conventionally used a multicore collective connector which can connect the optical fibers efficiently with a high density, with development a high density multicore cable which single mode type optical fiber tapes (ribbon fibers), for example, having four cores, eight cores and twelve cores. The connecting method is a method of positioning and fitting ferrules in which the multicore optical fibers are positioned and fixed with two guide pins, and the connector is called as an MT connector since the connector can be applied to a mechanical high-speed switching in addition to the collective connection of the optical fiber tapes, and has been in recent years put to practical use as a connector for connecting the optical fiber tapes having four cores, eight cores and twelve cores of an access series multicore cable.

Further, in recent years, an MPO connector has been put to practical used, the MPO connector being structured such as to be easily detachable according to a push-pull operation as a multicore collective connector having twenty four cores and seventy two cores further provided for connecting super multicore cables.

Specifically, as disclosed in patent document 1, there has been known a connector having a ferrule of an optical connector of a system which is provided with a fiber hole in a front end portion and is positioned with the other end ferrule by a fitting pin inserted to a guide pin hole, the ferrule being constructed by a connection end portion which is a part including the fiber hole and the guide pin hole, and a main body rear portion which is the other part than the connection end portion, and the main body rear portion being the portion except the connection end portion, and including an internal space in an inner portion, and the internal space being constructed by a coating insertion portion and a boot insertion portion.

More specifically, the optical connector in the patent document 1 mentioned above is provided with a pair of right and left positioning guide pin insertion holes 102 which pass through from a front end surface to a rear end surface of a ferrule main body 100 as well as being provided with a window portion 101 for filling an adhesive agent on an upper surface of the ferrule main body 100, and is structured such that a plurality of optical fiber core wire insertion holes 103 are provided side by side between both guide pin insertion holes 102 in the front end surface, as shown in FIGS. 13A and 13B. Further, the connector is structured such that a rear end surface of the ferrule main body 100 is provided with a rectangular opening shaped insertion opening portion 104 which inserts a rectangular tubular boot 106 (refer to FIGS. 12A and 12B) thereto and supports, and a rear end side of the ferrule main body 100 is provided with a collar portion 105 which protrudes outward from an outer peripheral surface of the ferrule main body 100.

Accordingly, the rectangular tubular boot 106 is formed into a flat surface in its upper and lower, and right and left outer wall surfaces, as shown in FIGS. 12A and 12B. Further, a pair of wide front opening portions 107a are formed in the front end portion of the boot 106, and a vertical width and a lateral width of the front opening 107a are set to magnitudes which correspond to a thickness and a lateral width of a single mode type ribbon fiber (optical fiber tape) T. A pair of upper and lower wide ribbon fiber insertion portions 107b are formed in the rear end portion of the boot 106, and a vertical width of the ribbon fiber insertion portions 197b is set to be somewhat smaller than a vertical width of the front opening portion 107a in the front end portion at such a degree that only a 12-core optical fiber core wire F protruding out of the front end portion of the single mode type ribbon fiber (optical fiber tape) T can protrudes outward.

Further, in the case of connecting two multicore optical cables each having a plurality of optical fibers, the optical cables are connected by inserting connector plugs installed in the respective multicore optical cables into a relay adapter. For example, in the optical fiber multicore connector, the MPO connectors having the MT ferrules built-in are inserted into the relay adapter and are fixed so that ground surfaces of the MT ferrules come into contact in parallel in the same manner as the case of the MT connector, so that the multicore connectors are connected via the relay adapter.

Conventionally, the MT type optical connector is structured, as shown in FIG. 14, such that a pin holder H is arranged so as to hold a rectangular tubular boot 106 protruding to a rear end surface of a collar portion 105 protruding outward from an outer peripheral surface of a ferrule main body 100, the pin holder H being provided for retaining a positioning pin P and formed into a C-shaped frame, and always applies a forward pressing force to the ferrule main body 100 by an elliptic spring SP which is installed astride the boot 106 and the pin holder H from a rear side in a pressure contact manner.

PRIOR ART DOCUMENT

Patent Document

Patent Document 1: Japanese Unexamined Patent Publication No. 2001-83367

SUMMARY OF THE INVENTION

Problem to be Solved by the Invention

In the meantime, in the case of the patent document 1 mentioned above, since the ribbon fiber insertion portion 107b is hard to be viewed when the ribbon fiber T is inserted into the ribbon fiber insertion portion 107b, it is necessary to insert the ribbon fiber T while viewing from a rear side surface of the boot 106. Therefore, in two or more ribbon fiber insertion portions 107b, there is a problem that an inserting operability of the ribbon fiber T is inferior.

Further, as shown in FIG. 14, the elliptic spring SP is installed astride the boot 106 and the pin holder H from a rear side at the assembling time, and applies the forward pressing force to the ferrule main body 10. As a result, there is a problem that a rear end corner portion 106A of the boot 106 interferes with the elliptic spring SP and a position of the elliptic spring SP itself is displaced.

Consequently, the present invention is provided while taking the conventionally existing various circumstances mentioned above into consideration, and an object of the present invention is to provide a boot for an optical connector ferrule which can improve an inserting property of a ribbon fiber by applying a guide function of the ribbon fiber to a ribbon fiber insertion portion, and further is structured such that a rear end corner portion of the boot for the optical connector ferrule does not interfere with an elliptic spring at the assembling time.

Means for Solving the Problem

In order to achieve the object mentioned above, according to the present invention, there is provided a boot for an optical connector ferrule, the boot including a ribbon fiber insertion portion which is internally provided with a single vertical partition portion or a plurality of vertical partition portions so as to section plural groups of ribbon fibers having a lot of optical fiber core wires in their leading ends into a plurality of stages and enable to insert the ribbon fibers, and a front opening portion which exposes the optical fiber core wires in the respective leading ends of the inserted ribbon fiber groups to a forward outer side, and the boot being inserted to a boot insertion opening portion which is formed in a rear end side of the optical connector ferrule, wherein a fiber guide of each of the ribbon fibers is provided so as to make the rear end portion side of the single vertical partition portion or the plurality of vertical partition portions internally provided in the ribbon fiber insertion portion protrude outward from the ribbon fiber insertion portion.

The fiber guide is formed by provision of an exposure notch portion which is notched at a predetermined length toward an inner side of the ribbon fiber insertion portion while leaving the vertical partition portion, in a side of rear end portion of both upper and lower wall surfaces of the ribbon fiber insertion portion.

The fiber guide is provided with standing guide portions at vertically symmetrical positions in both right and left ends of the fiber guide by being formed into an approximately H-shaped cross section in a rear view while leaving both right and left wall surfaces where the vertical partition portions of the ribbon fiber insertion portion are positioned at a time of forming the exposure notch portion.

There is provided a boot for an optical connector ferrule, the boot including a ribbon fiber insertion portion which can insert a ribbon fiber having a lot of optical fiber core wires in its leading end, and a front opening portion which exposes the optical fiber core wires in a leading end of the inserted ribbon fiber to a forward outer side, and the boot being inserted to a boot insertion opening portion which is formed in a rear end side of the optical connector ferrule, wherein the boot is provided with an exposure notch portion which is formed by diagonally rearward notching a rear end portion side of the ribbon fiber insertion portion from an upper wall surface side toward a lower wall surface side, and a fiber guide of the ribbon fiber is formed by a lower wall surface and both right and left wall surfaces in a rear end portion side which is exposed by the exposure notch portion.

The boot includes an elliptic spring which is attached to the boot for the optical connector ferrule for pressing the optical connector ferrule at the fitting time and maintaining the fitting, and the standing guide portion is formed so as to bridge over a part in a longitudinal direction of the elliptic spring.

The vertical partition portion has a concave portion which is notched into an approximately U-shaped form in a plane view from a rear end portion toward a forward side.

Effect of the Invention

According to the present invention, it is possible to improve the inserting property of the ribbon fiber by applying the guide function of the ribbon fiber to the ribbon fiber insertion portion, and it is further possible to prevent the rear end corner portion of the boot for the optical connector ferrule from interfering with the elliptic spring at the assembling time.

More specifically, according to the present invention, in the boot for the optical connector ferrule, the boot including the ribbon fiber insertion portion which is internally provided with the single vertical partition portion or a plurality of vertical partition portions so as to section plural groups of ribbon fibers having a lot of optical fiber core wires in their leading ends into a plurality of stages and enable to insert the ribbon fibers, and the front opening portion which exposes the optical fiber core wires in the respective leading ends of the inserted ribbon fiber groups to the forward outer side, and the boot being inserted to the boot insertion opening portion which is formed in the rear end side of the optical connector ferrule, the fiber guide of each of the ribbon fibers is provided so as to make the rear end portion side of the single vertical partition portion or the plurality of vertical partition portions internally provided in the ribbon fiber insertion portion protrude outward from the ribbon fiber insertion portion. As a result, it is not necessary to insert the ribbon fiber while viewing from the rearward side surface of the boot for the optical connector ferrule when the ribbon fiber is inserted into the ribbon fiber insertion portion, and it is possible to easily insert the ribbon fiber by the fiber guide.

The fiber guide is formed by provision of an exposure notch portion which is notched at a predetermined length toward an inner side of the ribbon fiber insertion portion while leaving the vertical partition portion, in a side of rear end portion of both upper and lower wall surfaces of the ribbon fiber insertion portion. As a result, it is possible to easily form the fiber guide only by the simple notch formation without taking a lot of trouble and cost for manufacturing.

The fiber guide is provided with standing guide portions at vertically symmetrical positions in both right and left ends of the fiber guide by being formed into an approximately H-shaped cross section in a rear view while leaving both right and left wall surfaces where the vertical partition portions of the ribbon fiber insertion portion are positioned at a time of forming the exposure notch portion. As a result, it is possible to easily form the standing guide portion only by the simple notch formation. Further, on the basis of the existence of the standing guide portion, both side end portions in a lateral width direction of the ribbon fiber can be smoothly inserted into the ribbon fiber insertion portion while being guided and retained by the standing guide portion when the ribbon fiber is inserted into the ribbon fiber insertion portion.

In the boot for the optical connector ferrule, the boot including the ribbon fiber insertion portion which can insert the ribbon fiber having a lot of optical fiber core wires in its leading end, and the front opening portion which exposes the optical fiber core wires in the leading end of the inserted ribbon fiber to the forward outer side, and the boot being inserted to the boot insertion opening portion which is formed in the rear end side of the optical connector ferrule, the boot is provided with the exposure notch portion which is formed by diagonally rearward notching the rear end portion side of the ribbon fiber insertion portion from the upper wall surface side toward the lower wall surface side, and the fiber guide of the ribbon fiber is formed by the lower wall surface and both the right and left wall surfaces in the rear end portion side which is exposed by the exposure notch portion. As a result, in the boot for the optical connector ferrule having the single ribbon fiber insertion portion, it is possible to easily form the fiber guide only by the single notch formation without taking a lot of trouble and cost for manufacturing, and it is possible to secure a retaining function in both the right and left ends of the ribbon fiber which is inserted into the ribbon fiber insertion portion.

The boot includes the elliptic spring which is attached to the boot for the optical connector ferrule for pressing the optical connector ferrule at the fitting time and maintaining the fitting, and the standing guide portion is formed so as to bridge over a part in the longitudinal direction of the elliptic spring. As a result, the rear end corner portion of the boot for the optical connector ferrule does not interfere with the elliptic spring at the assembling time, and it is possible to securely prevent the rear end corner portion from being crushed and damaged.

The vertical partition portion has the concave portion which is notched into the approximately U-shaped form in the plane view from the rear end portion toward the forward side. As a result, it is easy to carry out an inserting operation of the ribbon fiber into the ribbon fiber insertion portion in the lower side through the concave portion of the vertical partition portion.

BRIEF EXPLANATION OF THE DRAWINGS

FIGS. 1A, 1B and 1C show a boot for an optical connector ferrule according to an embodiment for carrying out the present invention, in which FIG. 1A is a perspective view as seen from a diagonally forward side, FIG. 1B is a perspective view as seen from a diagonally rearward side, and FIG. 1C is a perspective view as seen from the diagonally rearward side in a half notched state;

FIGS. 2A, 2B, 2C, 2D and 2E show the boot for the optical connector ferrule, in which FIG. 2A is a plane view, FIG. 2B is a front elevational view, FIG. 2C is a rear elevational view, FIG. 2D is a side elevational view and FIG. 2E is a bottom elevational view;

FIGS. 3A, 3B and 3C show the boot for the optical connector ferrule, in which FIG. 3A is a cross sectional view along a line A-A in FIG. 2A, FIG. 3B is a cross sectional view along a line B-B in FIG. 2D and FIG. 3C is a cross sectional view along a line C-C in FIG. 2C;

FIGS. 4A and 4B show the optical connector ferrule, in which FIG. 4A is a plane view and FIG. 4B is a cross sectional view along a line D-D in FIG. 4A;

FIGS. 5A, 5B, 5C and 5D show a state in which the boot is assembled and used in the optical connector ferrule, in which FIG. 5A is a perspective view of a state as seen from a diagonally rearward side, FIG. 5B is a perspective view of a state as seen from a diagonally forward side, FIG. 5C is a side cross sectional view and FIG. 5D is a plan cross sectional view;

FIGS. 6A, 6B, 6C, 6D and 6E show a boot for an optical connector ferrule according to the other embodiment, in which FIG. 6A is a plane view, FIG. 6B is a front elevational view, FIG. 6C is a rear elevational view, FIG. 6D is a side elevational view and FIG. 6E is a bottom elevational view;

FIGS. 7A, 7B, 7C and 7D show a boot for an optical connector ferrule according to further the other embodiment, in which FIG. 7A is a plane view, FIG. 7B is a front elevational view, FIG. 7C is a rear elevational view and FIG. 7D is a side elevational view;

FIGS. 9A, 9B and 9C show an example of the overall structure of the MPO connector, in which FIG. 9A is a side elevational view, FIG. 9B is a front elevational view and FIG. 9C is a rear elevational view;

FIG. 1C is a side elevational view according to a half cross section and shows an internal structure of the MPO connector;

FIGS. 12A and 12B show a boot for an MT ferrule according to the prior art, in which FIG. 12A is a perspective view as seen from a diagonally forward side and FIG. 12B is a perspective view as seen from a diagonally rearward side;

FIGS. 13A and 13B show a state in which a boot is assembled and used in an optical connector ferrule according to the prior art, in which FIG. 13A is a perspective view of a state as seen from a diagonally rearward side and FIG. 13B is a side cross sectional view; and FIGS. 14A and 14B show an example in which an elliptic spring is assembled in the optical connector ferrule according to the prior art, in which FIG. 14A is a plane view of a state before the assembly and FIG. 14B is a plane view of a state after the assembly.

DETAILED DESCRIPTION OF PREFERRED EMBODIMENT

Figure 3A:
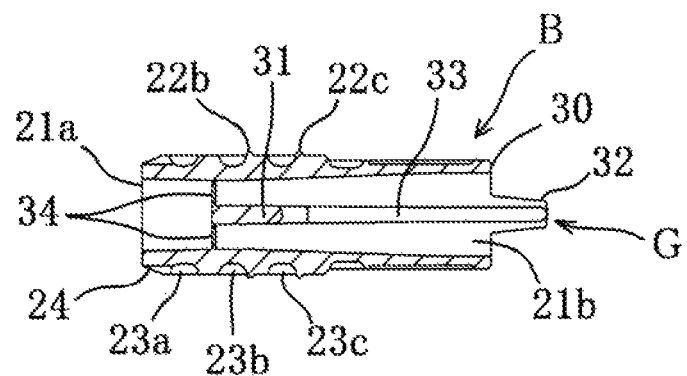
Figure 3B:
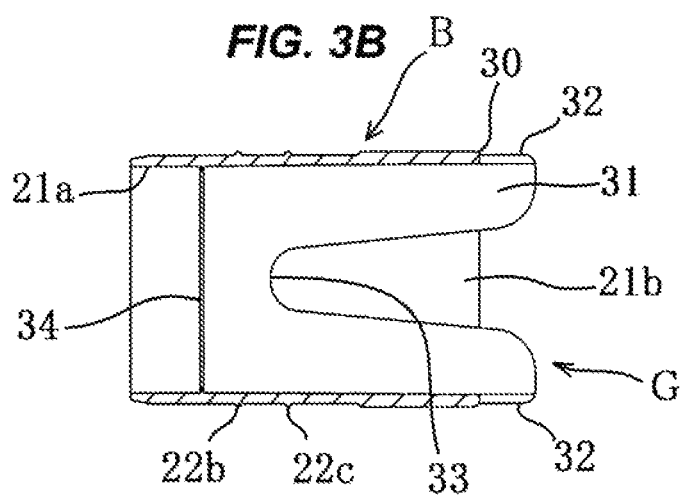
Figure 3C:
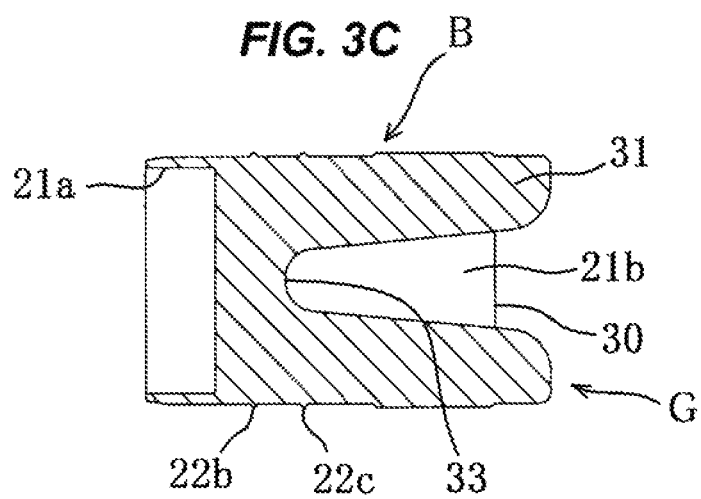

A description will be in detail given below of an embodiment according to the present invention with reference to the accompanying drawings.

In the present embodiment, an optical connector ferrule for forming a multicore collective connector according to the present invention is constructed by a ferrule main body 10 which is used as a multicore collective MT connector and is molded by resin into an approximately rectangular casing shape, the multicore collective MT connector to which a high-density multicore cable can be connected, the high-density multicore cable in which ribbon fibers T such as twelve-core single mode type optical fiber tapes are accommodated at plural stages, for example, vertically two stages, as shown in FIGS. 4 and 5. The connecting method is set to a method of positioning and fitting the ferrule main bodies 10 each other with two guide pins, the ferrule main bodies 10 to which multicore optical fibers are positioned and fixed.

Therefore, the following description relates to the MT connector according to the above structure, however, the present invention can be applied to an MT connector for a connecting high-density multicore cable which accommodates plural groups of ribbon fibers T corresponding to single mode type optical fiber tapes, for example, having four cores and eight cores, and further applied to a multicore collective connector, for example, an MPO connector mentioned later, which can be easily attached and detached according to a push-pull operation as a multicore collective connector having sixteen cores or eighty cores for connecting super multicore cables, without being limited to the MT connector. In the following description, the single mode type optical fiber tape is called as a ribbon fiber T, and the boot for the optical connector ferrule is abbreviated simply to a boot B.

<Structure of Boot>

The boot B is installed to an insertion opening portion 14 which is formed in a rear end surface side of the ferrule main body 10, is mentioned later and is formed into a rectangular opening shape, the boot B to which ribbon fibers T obtained, for example, by bundling optical fiber core wires F of twelve cores into a tape are inserted and fixed at vertically two stages.

Here, a description will be given of a specific structure of the boot B. As shown in FIGS. 1A, 1B, 1C, 2A, 2B, 2C, 2D, 2E, 3A, 3B and 3C, a horizontal and vertical width of a side front opening portion 21a in a front end portion of the boot B is a magnitude which corresponds to a horizontal and vertical length of the ribbon fiber T, and a vertical width of a wide opening shaped ribbon fiber insertion portion 21b in a rear end portion of the boot B is somewhat greater than a vertical width of the front opening portion 21a in the front end portion in such a degree that only upper and lower optical fiber core wires F, for example, having twelve cores, which protrudes out of a front end portion of the ribbon fibers T in vertically two stages can protrude outward.

More specifically, a vertical partition portion 31 is horizontally provided in an inner portion of the ribbon fiber insertion portion 21b so as to section two groups of ribbon fibers T having a lot of optical fiber core wires in their leading ends into vertically two stages and enable to insert. A leading end edge of the vertical partition portion 31 is arranged in somewhat inward back side in comparison with a position of the front opening portion 21a. A rear end of the ribbon fiber insertion portion 21b is formed into vertically two stages of insertion ports, and vertically two stages of inside opening portions 34 are formed in an inward back side of the front opening portion 21a, in a leading end edge side of the vertical partition portion 31 so as to be communicated with the insertion ports.

Further, each of rear end portion sides of both upper and lower wall surfaces of the ribbon insertion portion 21b forms an exposure notch portion 30 by being notched at a predetermined length toward an inner side of the ribbon fiber insertion portion 21b while leaving the vertical partition portion 31 which is provided at the center in a vertical direction of the boot B. As a result, the rear end portion side of the vertical partition portion 31 comes to a state of being protruded outward from the ribbon fiber insertion portion 21b, and a fiber guide G of each of the ribbon fibers T is formed.

At this time, since the fiber guide G is formed into an approximately H-shaped cross section in a rear view (a transversely T-shaped form in each of right and left sides, refer to FIGS. 1B, 1C and 2C) while leaving both right and left wall surfaces where the vertical partition portions 31 of the ribbon fiber insertion portion 21b are positioned, standing guide portions 32 are formed at vertically symmetrical positions in both the right and left ends of the fiber guide G.

Further, a concave portion 33 notched into an approximately U-shaped form in a plane view from a rear end portion toward a forward side is formed in the vertical partition portion 31, thereby facilitating an inserting operation of the ribbon fiber T into the ribbon fiber insertion portion 21b in a lower side through the concave portion 33 of the vertical partition portion 31.

In the present embodiment, the fiber guide G is formed by the vertical partition portion 31 which is formed by notching the exposure notch portion 31, however, the forming method is not limited to this, and the fiber guide G may be formed by integrally injection molding only the vertical partition portion 31 from the ribbon fiber insertion portion 21b extensionally at a time of manufacturing the boot B without necessity of a processing operation according to a notching formation after the manufacturing. Further, in the present embodiment, the ribbon fiber insertion portion 21b can insert two groups of ribbon fibers T while sectioning the ribbon fibers T into vertical two stages by the single vertical partition portion 31, however, is not limited to this and may be structured such that the ribbon fiber insertion portion 21b can insert plural groups of ribbon fibers T while sectioning the ribbon fibers T into vertically plural stages by two or more vertical partition portions 31.

The boot B is provided with two protrusions 22b and 22c which can be crushed by being inserted into an insertion opening portion 14 formed in a rear end side of the ferrule main body 10, on a whole surface of a surface along a perpendicular direction to an inserting direction of the boot B. The number of these protrusions 22b and 22c may be set to one or three in place of two, or may be set to four or more. Further, these protrusions 22b and 22c are formed on the whole periphery of the boot B in the illustration, however, may be formed in a part of the whole periphery, for example, only on upper and lower surfaces.

Further, as shown in FIGS. 1A, 1B, 1C, 2A and 2E, four adhesive agent reservoir portions 23a, 23b, 23c and 23d formed into a rectangular concave groove shape are provided in a concave manner at vertically symmetrical positions of the surface of the boot B so as to be close to respective front and rear sides of the protrusions 22b and 22c, whereby it is possible to retain an adhesive agent V which is injected from an adhesive agent filling window portion 11 (refer to FIGS. 4 and 5) mentioned later of the ferrule main body 10 and leaks out of a gap between the boot B and the insertion opening portion 14 of the ferrule main body 10. Specifically, the first protrusion 22a is formed in such a manner as to be adjacent to a rear edge side of the adhesive agent reservoir portion 23a which is positioned in the forefront end side, the second protrusion 22b is formed in such a manner as to be adjacent to a rear edge side of the adhesive agent reservoir portion 23b which is positioned at the second rearward, and the third protrusion 22c is formed in such a manner as to be adjacent to a rear edge side of the adhesive agent reservoir portion 23c which is positioned at the third rearward.

The protrusions 22a, 22b and 22c formed in the boot B are formed as "dams" which are arranged side by side in a multiple manner via the adhesive agent reservoir portions 23a, 23b, 23c and 23d formed into the rectangular groove shape, and closes the gap between the boot B and the ferrule main body 10. As mentioned above, the horizontal and vertical width of the insertion opening portion 14 of the ferrule main body 10 is set to be approximately the same or somewhat greater than the horizontal and vertical width of the boot B, and a height from the surface of the boot B is set, for example, to about 0.1 to 0.5 mm in correspondence to the horizontal and vertical width of the boot B in order to make the protrusions 22a, 22b and 22c be easily crushed to a predetermined height position when the boot B is inserted into the insertion opening portion 14 of the ferrule main body 10. It goes without saying that the height does not restrict the technical scope of the present invention.

Further, as shown in FIGS. 1A, 1B and 1C, an adhesive agent induction groove 24 for inducing the adhesive agent V into the adhesive agent reservoir portion 23a is provided at the center of a forward edge side (a portion forming a forward downward inclined surface in the drawing) of the adhesive agent reservoir portion 23a which is positioned in the forefront end side of each of both upper and lower surfaces of the boot B, and the adhesive agent V is induced to the adhesive agent reservoir portion 23a through the adhesive agent induction groove 24, so that the adhesive agent V is filled like an approximately T-shaped form in a plane view.

<Structure of Ferrule Main Body>

Figure 4A:
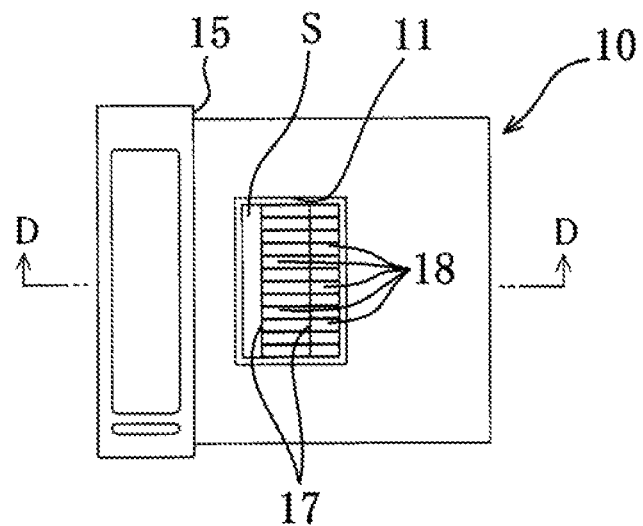
Figure 4B:
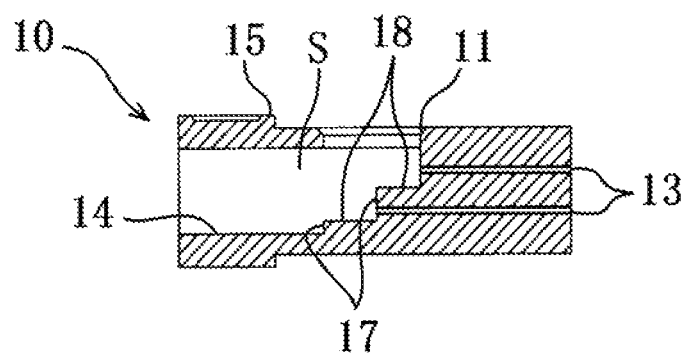
Figure 8:
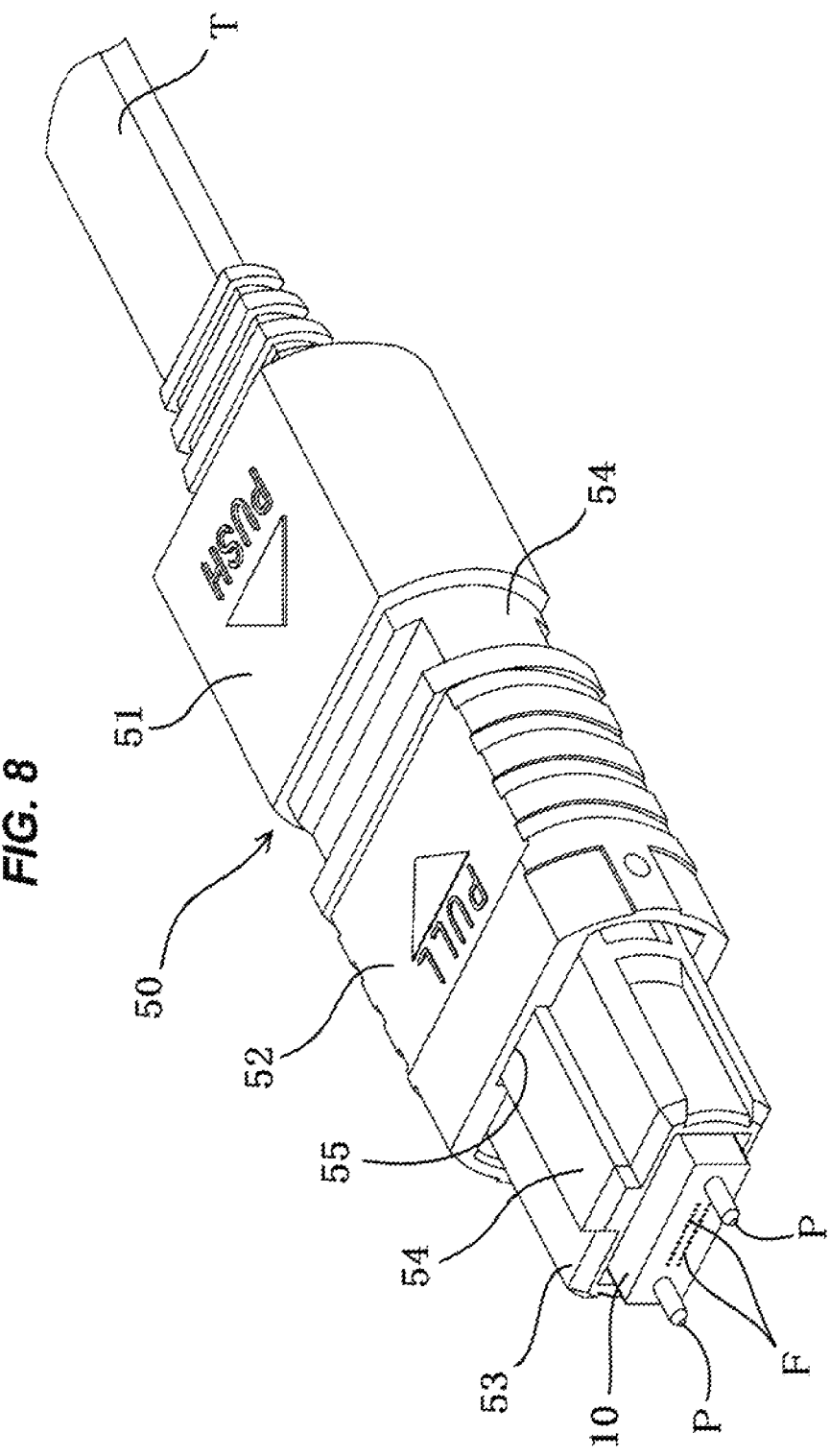
FIG. 8 is a perspective view showing an example of an overall structure of an MPO connector.
Figure 9A:
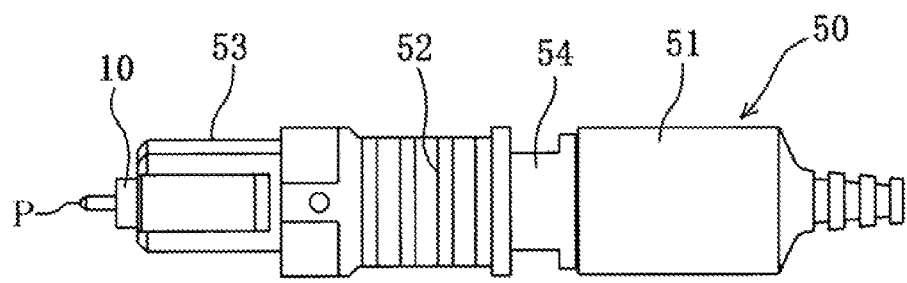
Figure 9B:
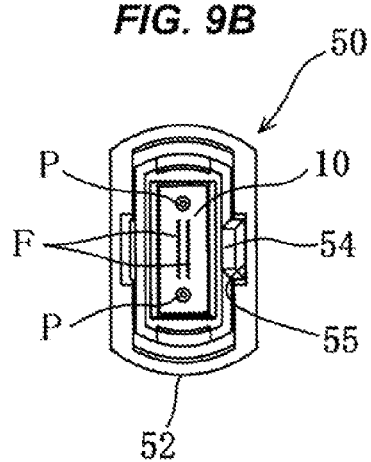
Figure 9C:
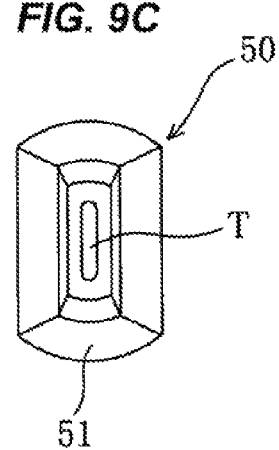
Figure 10:
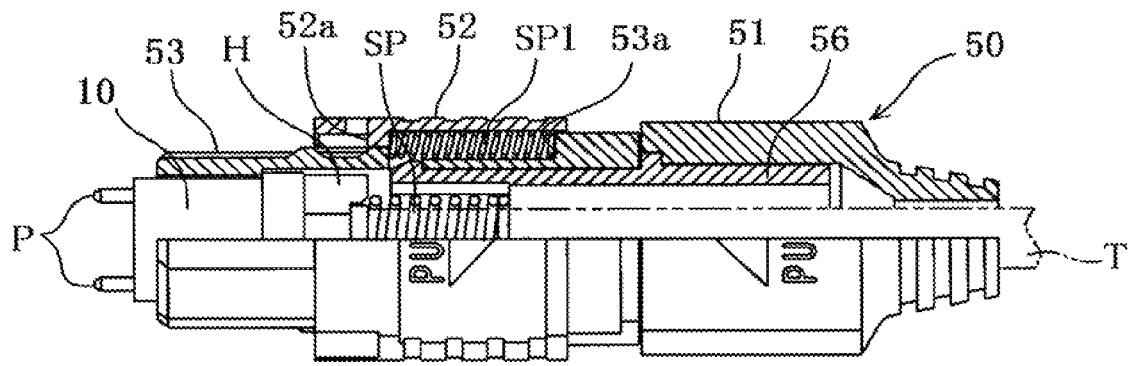

Describing a specific structure of the ferrule main body 10, as shown in FIGS. 4A and 4B, in the rear end surface side of the ferrule main body 10, there is formed the rectangular opening shaped insertion opening portion 14 for installing the approximately rectangular tubular boot B to which the ribbon fiber T obtained by bundling twelve cores of optical fiber core wires F like the tape, as mentioned above. An internal portion of the ferrule main body 10 forms an accommodating space portion S of the boot B in such a manner that a part (about half) of the front end side of the boot B is accommodated through the insertion opening portion 14.

Further, as shown in FIGS. 4B, 5B, 5C and 5D, optical fiber core wire insertion holes 13 forming twelve small holes are pierced in the front end surface side of the ferrule main body 10 up to a position which is inward back portion of the insertion opening portion 14 of the ferrule main body 10 (a forward end inner wall of the accommodating space portion S of the boot B), whereby each of the optical fiber core wire insertion holes 13 comes to a state of being communicated with the accommodating space portion S of the boot B.

In the illustrated example (refer to FIGS. 4B and 5C), two step portions 17 are formed at positions short of the inward back portion of the accommodating space portion S so as to face to rear side edge portion positions of the adhesive agent filling window portion 11, and a lower portion side of a leading end surface of the inserted boot B is locked at the position short of the adhesive agent filling window portion 11 by the lower step portion 17 among two step portions 17. At this time, the respective leading end portions of twelve cores of optical fiber core wires F protruding out of the leading end side of the ribbon fiber T in the upper stage are inserted to twelve optical fiber core wire insertion holes 13 in the upper stage from the inner side of the accommodating space portion S of the boot B, and the respective leading end portions of twelve cores of optical fiber core wires F protruding out of the leading end side of the ribbon fiber T in the lower stage are inserted to twelve optical fiber core wire insertion holes 13 in the lower stage from the inner side of the accommodating space portion S of the boot B, thereby exposing the end surfaces of the leading end portions to the front surface side of the ferrule main body 10 in both the upper and lower stages.

Further, the approximately rectangular opening shaped adhesive agent filling window portion 11 is pierced approximately at the center of the upper surface of the ferrule main body 10 as mentioned above, an upper half of the ferrule main body 10 is under a bored state from the inward back portion side of the insertion opening portion 14 of the ferrule main body 10 (the forward end inner wall of the accommodating space portion S of the boot B) to the rear end opening portions of respective upper and lower twelve optical fiber core wire insertion holes 13, and twelve U-shaped guide grooves 18 are totally formed from the rear end opening portions of the optical fiber core wire insertion holes 13 to positions approximately facing to the center of the adhesive agent filling window portion 11 (the upper surfaces of two step portions 17) (refer to FIGS. 4B and 5).

Therefore, in FIG. 4A, the U-shaped guide grooves 18 can be viewed through the adhesive agent filling window portion 11 over the rear end opening portions of the optical fiber core wire insertion hole 13 and the upper surfaces of two step portions 17. Further, in a state in which the boot B is installed to the insertion opening portion 14 of the ferrule main body 10 and the respective leading end portions of the optical fiber core wires F are inserted to the respective optical fiber core wire insertion holes 13 in the upper and lower stages, respective twelve cores of optical fiber core wires F in the upper and lower stages protruding out of the leading end side of the ribbon fiber T, for example, the single mode type optical fiber tape are firmly fixed to the ferrule main body 10 by injecting the adhesive agent V, for example, of an epoxy resin from the adhesive agent filling window portion 13.

Further, as shown in FIGS. 5A, 5B and 5D, a pair of right and left positioning guide pin insertion holes 12 are provided in a penetrating manner from the front end surface to the rear end surface of the ferrule main body 10, and the optical fiber core wire insertion holes 13 in upper and lower two stages are under a state of being arranged side by side horizontally in a line between both the guide pin insertion holes 12 in the front end surface of the ferrule main body 10.

As shown in FIGS. 4 to 5, the rear end side of the ferrule main body 10 is provided with a collar portion 15 which protrudes outward from an outer peripheral surface of the ferrule main body 10.

Next, a description will be given in detail of an example of an assembly use of the embodiment which is constructed as mentioned above.

Two ribbon fibers T are sectioned into upper and lower two stages and inserted into an inner portion of the ribbon fiber insertion portion 21b of the boot B shown in FIGS. 1 to 3. First of all, the ribbon fiber T in the lower side is first inserted. More specifically, the ribbon fiber T is inserted along the fiber guide G formed by the vertical partition portion 31 protruding rearward of the ribbon fiber insertion portion 21b and while making both right and left side downward standing guide portions 32 guide both end sides of the lateral width of the ribbon fiber T. At this time, it is possible to discriminate whether or not the ribbon fiber T is securely inserted into the inner portion of the ribbon fiber insertion portion 21b through the concave portion 33 of the fiber guide G (the protruding vertical partition portion 31). After the insertion, the optical fiber core wire F protrudes out of the inner opening portion 34 in the lower stage of the ribbon fiber insertion portion 21b (the lower side of the vertical partition portion 31), and the end surface of the optical fiber core wire F is under a state of being pulled forward out of the front opening portion 21a.

Next, the ribbon fiber T in the upper side is inserted. More specifically, the ribbon fiber T is inserted along the fiber guide G and while making both right and left upward standing guide portions 32 guide both end sides of the lateral width of the ribbon fiber T. After the insertion, the optical fiber core wire F protrudes out of the inner opening portion 34 in the upper stage of the ribbon fiber insertion portion 21b (the upper side of the vertical partition portion 31), and the end surface of the optical fiber core wire F is under a state of being pulled forward out of the front opening portion 21a.

Next, as shown in FIG. 5, the boot B is inserted to the insertion opening portion 14 of the ferrule main body 10, the boot B to which the ribbon fibers T obtained by bundling twelve cores of optical fiber core wires F like the tape are installed in upper and lower two stages. At this time, each of three protrusions 22a, 22b and 22c is crushed to a predetermined height position, and closes the gap between the boot B and the ferrule main body 10.

Further, at the same time as the leading end surface of the boot B inserted as mentioned above is locked in its lower portion side at the position short of the adhesive agent filling window portion 11 by the rear step portion 17 among two front and rear step portions within the accommodating space portion S of the ferrule main body 10, the leading end portion of each of twelve cores of optical fiber core wires F in the leading end side of the ribbon fibers T in upper and lower two stages is inserted to each of twelve optical fiber core wire insertion holes 13 in the upper and lower stages along the U-shaped guide groove 18, and the end surface of the leading end portion is exposed to the front surface side of the ferrule main body 10.

Finally, a root portion of each of the optical fiber core wires F is adhesion integrated with the ferrule main body 10 by filling the adhesive agent V from the adhesive agent filling window portion 11 of the ferrule main body 10, the optical fiber core wires F being constructed by respective upper and lower twelve cores (totally twenty four cores) protruding out of the leading end side of the ribbon fiber T, and both of the leading end portion of the ribbon fiber T and the root portion of the optical fiber core wire F protruding out of the leading end portion are firmly fixed by the adhesive agent V. At this time, the adhesive agent V is induced to the adhesive agent reservoir portion 23*a* which is positioned in the forefront end side of each of the upper and lower surfaces of the boot B through the adhesive agent induction groove 24 which is provided at the center of the boot B, and the adhesive agent V is filled like an approximately T-shaped form in a plane view.

In this connection, the description is all given above of the MT connector, however, the present invention can be applied to the other types of multicore optical connectors.

<Boot for Optical Connector Ferrule in the Other Example>

In the present example, the standing guide portion 32 is formed into an approximately circular arc shape in a side view from each of the upper side wall surface and the lower side wall surface of the ribbon fiber insertion portion 21*b* up to the vertical partition portion 31. In the present example, the same reference numerals are attached to the same constituting portions as those of the present embodiment and a detailed description thereof will be omitted. It goes without saying that the same operations and effects as those of the present embodiment can be achieved in the present example.

<Boot for Optical Connector Ferrule in Further the Other Example>

In the present example, as shown in FIG. 7, an exposure notch portion 40 is provided by notching a rear end portion of the ribbon fiber insertion portion 21*b* toward a diagonally rear side from an upper wall surface side to a lower wall surface side, in the ribbon fiber insertion portion 21*b* which can insert one ribbon fiber T having a lot of optical fiber core wires in its leading end and is provided with a single insertion hole having no vertical partition portion 31. Therefore, a lower wall surface 41 in a leading end portion exposed by the exposure notch portion 40 and both right and left wall surfaces 42 approximately having a triangular shape form the fiber guide G of the ribbon fiber T. In the present example, the same reference numerals are attached to the same constituting portions as those of the present embodiment, and a detailed description thereof will be omitted (in this case, the protrusion 22*a* is additionally formed in the vicinity of the adhesive agent reservoir portion 23*a* in FIG. 7). It goes without saying that the same operations and effects as those of the present embodiment can be achieved in the present example.

<Overall Structure of MPO Connector>

A description will be given below of a case that the boot B according to the structure of the present embodiment is applied to a multicore collective connector such as an MPO connector 50 which can be easily attached and detached according to a push-pull operation. In this case, the MPO connector 50 is a multicore optical connector which employs an MT type optical connector, for example, an F12 type multicore optical fiber connector (JIS.C5981) as the optical connector ferrule.

As shown in FIGS. 8, 9A, 9B, 9C and 1C, the MPO connector 50 is constructed by an MPO boot 51, a coupling 52, a spring push 56 which is inward fitted to the MPO boot 51 and a housing 53, a coil spring SP1 which is interposed between a locking projection 52*a* provided in front of an inner side of the coupling 52 and an accommodating recess portion 53*a* provided at the rear of the housing 53, and energizes the coupling 52 forward, a ferrule main body 10 which is inward wrapped in the housing 53, is protruded and energized its leading end to the spring push 56 via an elliptic spring SP from a leading end of the housing 53, and accommodates a lot of optical fiber core wires F in a state in which their end surfaces are exposed, and a positioning pin P which is extended outward from the ferrule main body 10.

A key projection 54 is protruded in a longitudinal direction at the center of an upper wall surface of the housing 53, and a key groove 55 is protruded in a longitudinal direction at the center of an upper wall inner surface of the coupling 52 in correspondence thereto. On the basis of a loose fitting of the key projection 54 and the key groove 55, the coupling 52 can slide a compression coil spring SP1 rearward in relation to the housing 53 while compressing. Therefore, it is possible to expose (forward move) the housing 53 according to a sliding operation of the coupling 52 when the ferrule main body 10 is fitted to the other side connector (not shown).

Figure 11:
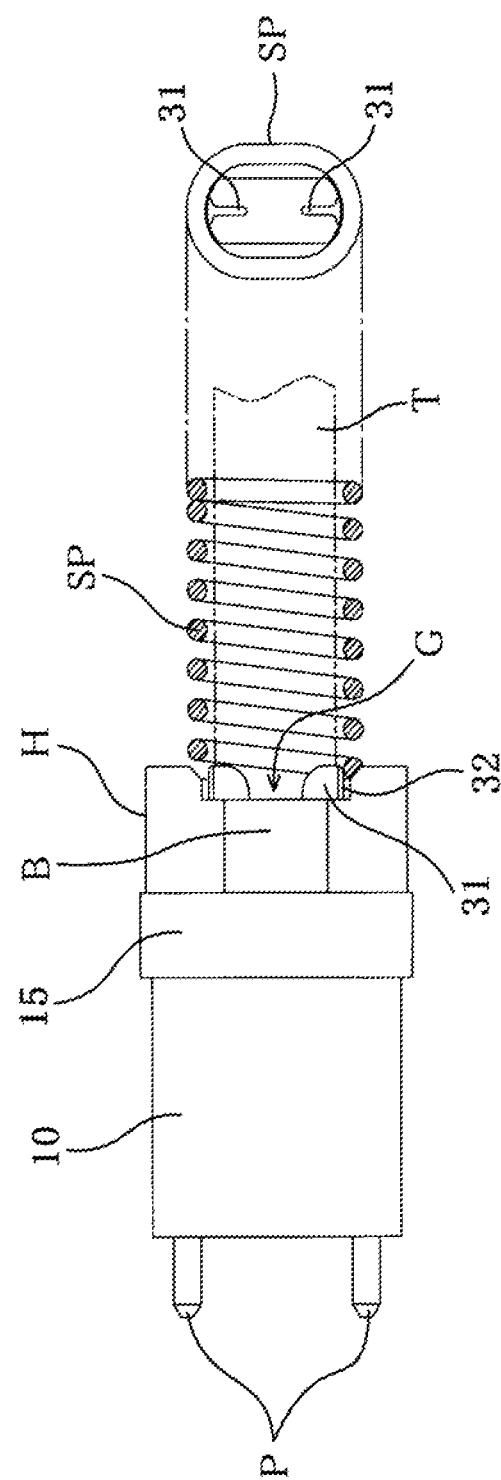
FIG. 11 is a plane view of a state after an elliptic spring is assembled in the optical connector ferrule.
Figure 12A:
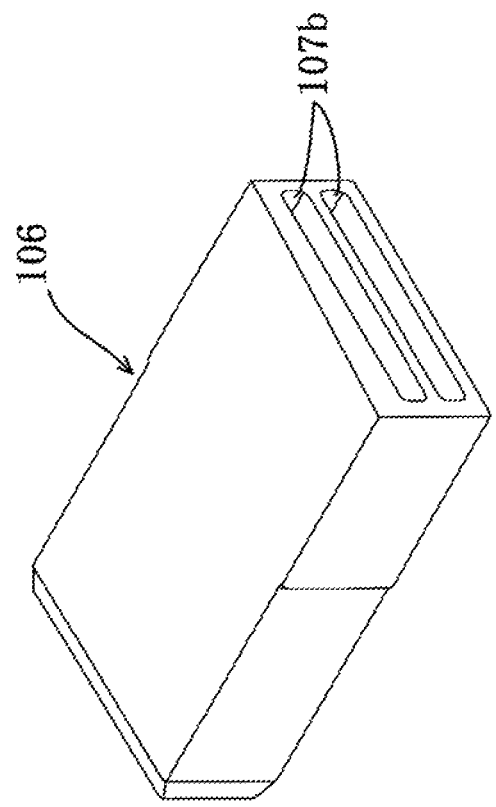
Figure 12B:
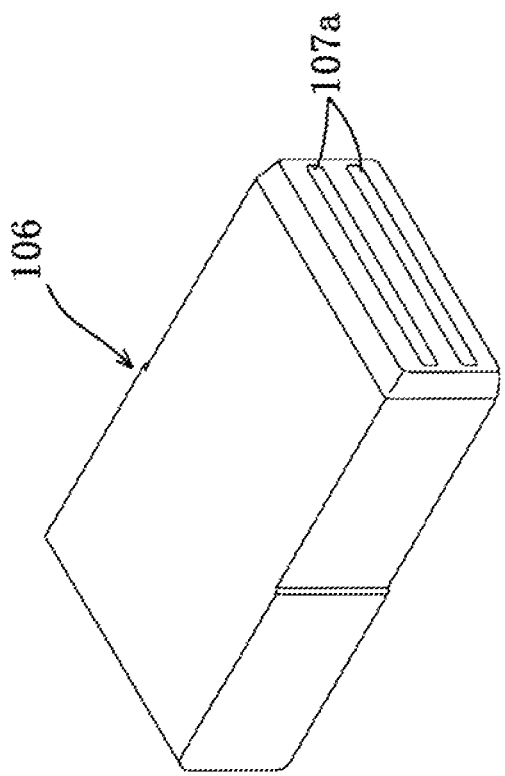
Figure 13A:
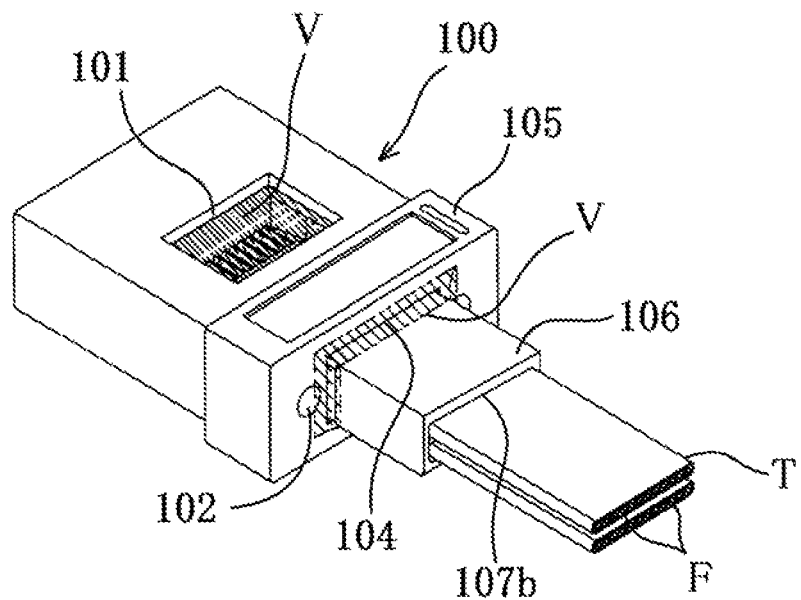
Figure 13B:
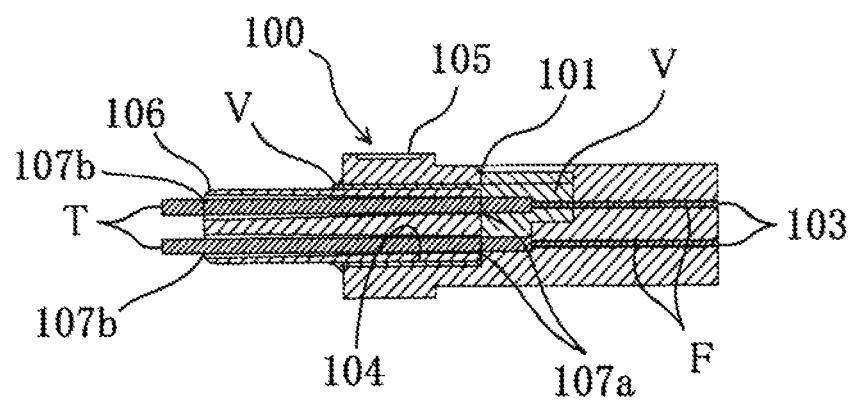

Further, in FIG. 11, reference symbol H denotes a pin holder which is provided for retaining a positioning pin P and is formed into a C-shaped frame. The pin holder H is arranged so as to hold the boot B protruding to a rear side of the ferrule main body 10, and the elliptic spring SP always applies a forward pressing force to the ferrule main body 10. In other words, the elliptic spring SP is attached so as to wind up the ribbon fiber T in the rear side of the boot B for maintaining the fitting by pressing the optical connector ferrule 10 when the ferrule main body 10 is fitted to the other side connector (not shown). In this case, the standing guide portion 32 in the fiber guide G is formed so as to bridge a part (an outer side) in the longitudinal direction of the elliptic spring SP.

Specifically, since the leading end side along the longitudinal direction of the elliptic spring SP is locked at the intermediate position between the pin holder H and the standing guide portion 32, the leading end of the elliptic spring SP does not directly come into contact with the rear end corner portion of the boot B. Therefore, the rear end corner portion of the boot B does not interfere with the elliptic spring SP at the assembling time, and it is possible to securely prevent the rear end corner portion from being crushed and damaged (refer to a front state drawing after the assembly in FIG. 11).

DESCRIPTION OF REFERENCE NUMERALS

B boot for optical connector ferrule (boot)
V adhesive agent

T optical fiber tape
F optical fiber corner wire
S accommodating space portion
G fiber guide
H pin holder
SP elliptic spring
SP1 compression coil spring
P positioning pin
10 ferrule main body
11 adhesive agent filling window portion
12 guide pin insertion hole
13 optical fiber core wire insertion hole
14 boot insertion opening portion
15 collar portion
17 step portion
18 guide groove
21a front opening portion
21b ribbon fiber insertion portion
22a, 22b, 22c protrusion
23a, 23b, 23c, 23d adhesive agent reservoir portion
24 adhesive agent induction groove
30, 40 exposure notch portion
31 vertical partition portion
32 standing guide portion
33 concave portion
34 inner opening portion
41 lower wall surface
42 both right and left wall surfaces
50 MPO connector
51 MPO boot
52 coupling
52a locking projection
53 housing
53a accommodating recess portion
54 key projection
55 key groove
56 spring push
100 ferrule main body
101 window portion
102 guide pin insertion hole
103 optical fiber core wire insertion hole
104 insertion opening portion
105 collar portion
106 boot
107a front opening portion
107b ribbon fiber insertion portion

What is claimed is:

1. A boot for an optical connector ferrule, the boot comprising:

a ribbon fiber insertion portion which is internally provided with a single vertical partition portion or a plurality of vertical partition portions so as to section plural groups of ribbon fibers having a lot of optical fiber core wires in their leading ends into a plurality of upper and lower stages and enable to insert the ribbon fibers;

a front opening portion which exposes the optical fiber core wires in the respective leading ends of said inserted ribbon fiber groups to a forward outer side; and the boot being configured to be inserted to a boot insertion opening portion which is formed in a rear end side of the optical connector ferrule, wherein a fiber guide of each of said ribbon fibers is provided so as to make the rear end portion side of said single vertical partition portion or said plurality of vertical partition portions internally provided in said ribbon fiber insertion portion protrude outward from said ribbon fiber insertion portion, wherein said fiber guide is formed by provision of an exposure notch portion which is notched at a predetermined length toward an inner side of the ribbon fiber insertion portion while leaving said vertical partition portion, in a side of rear end portion of both upper and lower wall surfaces of said ribbon fiber insertion portion, and wherein said fiber guide is provided with standing guide portions at vertically symmetrical positions in both right and left ends of the fiber guide by being formed into an approximately H-shaped cross section in a rear view while leaving both right and left wall surfaces where said vertical partition portions of said ribbon fiber insertion portion are positioned at a time of forming said exposure notch portion.

2. A boot for an optical connector ferrule, the boot comprising:

a ribbon fiber insertion portion which is internally provided with a single vertical partition portion or a plurality of vertical partition portions so as to section plural groups of ribbon fibers having a lot of optical fiber core wires in their leading ends into a plurality of upper and lower stages and enable to insert the ribbon fibers;

a front opening portion which exposes the optical fiber core wires in the respective leading ends of said inserted ribbon fiber groups to a forward outer side; and the boot being configured to be inserted to a boot insertion opening portion which is formed in a rear end side of the optical connector ferrule, wherein a fiber guide of each of said ribbon fibers is provided so as to make the rear end portion side of said single vertical partition portion or said plurality of vertical partition portions internally provided in said ribbon fiber insertion portion protrude outward from said ribbon fiber insertion portion, and wherein said fiber guide is provided with standing guide portions at vertically symmetrical positions in both right and left ends of the fiber guide by being formed into an approximately H-shaped cross section in a rear view while leaving both right and left wall surfaces where said vertical partition portions of said ribbon fiber insertion portion are positioned at a time of forming said fiber guide as a provision of an exposure notch portion.

3. The boot for the optical connector ferrule according to claim 2, further comprising an elliptic spring which is attached to the boot for said optical connector ferrule for pressing said optical connector ferrule at a fitting time and maintaining the fitting, wherein said standing guide portion is formed so as to bridge over a part in a longitudinal direction of said elliptic spring.

4. The boot for the optical connector ferrule according to claim 2, wherein said vertical partition portion has a concave portion which is notched into an approximately U-shaped form in a plan view from a rear end portion toward a forward side.

* * * * *